US008831040B2

(12) United States Patent
Nakajima et al.

(10) Patent No.: US 8,831,040 B2
(45) Date of Patent: Sep. 9, 2014

(54) DATA TRANSFER DEVICE AND DATA TRANSFER SYSTEM

(75) Inventors: Tetsuya Nakajima, Yokohama (JP); Masatoshi Shibasaki, Yokohama (JP); Yukihisa Tamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 763 days.

(21) Appl. No.: 13/021,550

(22) Filed: Feb. 4, 2011

(65) Prior Publication Data

US 2011/0216782 A1 Sep. 8, 2011

(30) Foreign Application Priority Data

Mar. 3, 2010 (JP) ................................ 2010-046264

(51) Int. Cl.
*H04J 3/06* (2006.01)
*H04L 1/00* (2006.01)

(52) U.S. Cl.
CPC .................................. *H04L 1/0072* (2013.01)
USPC ......................................... 370/474; 370/503

(58) Field of Classification Search
None
See application file for complete search history.

(56) References Cited

U.S. PATENT DOCUMENTS 6,882,637 B1 * 4/2005 Le et al. ......................... 370/349
7,139,271 B1 * 11/2006 Parruck et al. ................. 370/392

FOREIGN PATENT DOCUMENTS

| CN | 101098328 A | 1/2008 |
|----|-------------|--------|
| CN | 101345745 A | 1/2009 |
| EP | 0 935 363 A1 | 8/1999 |
| EP | 1 063 830 A1 | 12/2000 |
| EP | 1 806 865 A2 | 7/2007 |
| EP | 2173136 A1 | 4/2010 |
| JP | H07-1431000 A | 6/1995 |
| JP | 2005-072714 | 3/2005 |
| JP | 2008-294510 A | 12/2008 |
| JP | 2009-060446 | 3/2009 |
| WO | WO 2009/006818 A1 | 1/2009 |

OTHER PUBLICATIONS

IEEE Std 802.3—2008; Part 3: Carrier sense multiple access with collision detection (CSMA/CD) access method and physical layer specifications; Dec. 26, 2008; pp. 1-586.
Handley, Mark; GeRM: Generic RTP Multiplexing; Internet Engineering Task Force; XP-002139359; Nov. 11, 1998; pp. 1-7.
European Patent Office extended search report on application No. 11152664.6 dated Jul. 20, 2011; 7 pages.
The Japanese Office Action received in the counterpart Japanese patent application No. JP 2010-046264, dated Aug. 20, 2013.

* cited by examiner

*Primary Examiner* — Alex Skripnikov
(74) *Attorney, Agent, or Firm* — Foley & Lardner LLP

(57) ABSTRACT

A transfer device according to an embodiment transfers blocks generated by dividing a frame into pieces of data and adding a synchronization header each of the pieces of data. The blocks comprise a first, second and third blocks in this order. The transfer device is configured to acquire a first synchronization header in the first block, a second synchronization header in the second block and a third synchronization header in the third block, judge, in a case where a value of the second synchronization header is incorrect, as to whether or not the value of the second synchronization header can be estimated based on the first and the third synchronization headers so that the second block is consistent with the first and third blocks, and correct the second synchronization header into the estimated value.

10 Claims, 9 Drawing Sheets

FIG. 11

| | SYNCHRONIZATION HEADER OF PRECEDING BLOCK | BlockTypeField OF PRECEDING BLOCK | SYNCHRONIZATION HEADER OF SUCCEEDING BLOCK | BlockTypeField OF SUCCEEDING BLOCK | BlockTypeField OF INTERMEDIATE BLOCK | CORRECTION CANDIDATE FOR SYNCHRONIZATION HEADER |
|---|---|---|---|---|---|---|
| 211 | 01 | — | 01 | — | — | 01 |
| 212 | 01 | — | 10 | 0x33 | 0x87 | 10 |
| 213 | 10 | 0x87 | 10 | 0x1e | 0x1e | 10 |
| ... | | | | | | |

US 8,831,040 B2

DATA TRANSFER DEVICE AND DATA TRANSFER SYSTEM

CLAIM OF PRIORITY

The present application claims priority from a Japanese patent application JP 2010-46264 filed on Mar. 3, 2010, the content of which is hereby incorporated by reference into this application.

FIELD OF THE INVENTION

This invention relates to a data transfer device, and more particularly to a technology for recovering data (for example, synchronization header) used for transferring data in the physical layer.

BACKGROUND OF THE INVENTION

In some protocols used for data transfer performed between network nodes, the synchronization header (Sync-Header) for data synchronization is inserted at predetermined intervals. For example, in 10 Gigabit Ethernet, 64B/66B encoding is used to transmit data in 66-bit blocks (see, for example, JP 2005-72714 A). The 66-bit block includes a 2-bit synchronization header ("01" or "10") and a 64-bit payload. In other words, the 2-bit synchronization header is inserted every 66 bits.

Hence, a sender node encodes 64-bit data into 66 bit-data by adding a 2-bit synchronization header thereto. A receiver node finds the 2-bit synchronization header that arrives every 66 bits, and decodes the 64-bit data following the synchronization header. Further, the synchronization header having a value of "01" indicates that the 64-bit data following the synchronization header is user data, and the synchronization header having a value of "10" indicates that the 64-bit data following the synchronization header is data including a control code (see, for example, IEEE 802.3ae).

SUMMARY OF THE INVENTION

Data transferred as an electrical signal or an optical signal through a network is sometimes rewritten by influence of noise or the like. Such a data error in the physical layer cannot be recovered by error correction in the upper layers (the data link layer, the network layer, and the like).

For example, if the synchronization header is corrupt and rewritten into "00" or "11" by the noise on a transmission path or the like, the receiver node cannot judge whether or not the payload is the user data or the data including a control code and therefore cannot decode received data, with the result that the 64-bit payload is discarded.

An object of this invention is, even if a block having a corrupt synchronization header is received, to appropriately process previously discarded data by estimating a correct value of the synchronization header from a relationship with the preceding and succeeding data and correcting the synchronization header.

A representative aspect of this invention is as follows. That is, there is provided a data transfer device for transferring blocks generated by dividing a frame into pieces of data having a first predetermined number of bits and adding a synchronization header having a second predetermined number of bits to each of the pieces of data obtained by the dividing. The data transfer device comprises a processing module for processing an operation of the data transfer device, a buffer for storing a block to be transferred, and an interface for receiving and transmitting g data to and from the data transfer device. The blocks comprise a first block, a second block and a third block that are successively transferred in the stated order. The processing module is configured to acquire a first synchronization header included in the first block, a second synchronization header included in the second block, and a third synchronization header included in the third block, perform, in a case where a value of the second synchronization header is incorrect, a first judgment as to whether or not the value of the second synchronization header can be estimated based on the first synchronization header and the third synchronization header so that the second block is consistent with the first block and the third block, and correct the second synchronization header into the estimated value.

According to one aspect of this invention, it is possible to correct corrupt synchronization headers and to suppress loss of effective data or reduction of transfer efficiency due to discarding of blocks.

BRIEF DESCRIPTION OF THE DRAWINGS

The present invention can be appreciated by the description which follows in conjunction with the following figures, wherein:

FIG. 11 is a diagram illustrating an error correction table according to the second embodiment.

DETAILED DESCRIPTION OF THE PREFERRED EMBODIMENTS

First Embodiment

Figure 1:
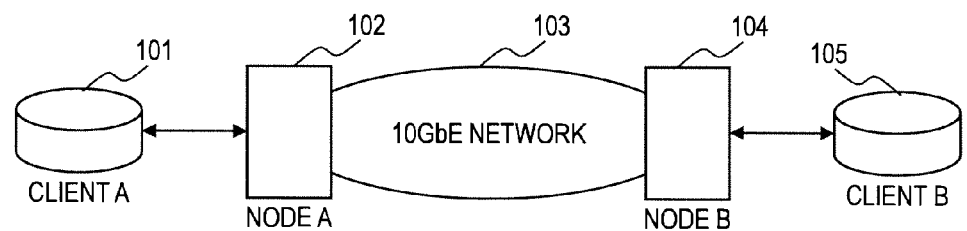
FIG. 1 is a diagram illustrating configuration of a system according to a first embodiment of this invention.

FIG. 1 is a diagram illustrating a configuration of a system according to a first embodiment of this invention.

The system of the first embodiment includes client terminals 101 and 105, network nodes 102 and 104, and a network 103.

The client terminals 101 and 105 are each a computer that transmits/receives data via the network 103, including a processor, a memory, and a network interface. The network nodes 102 and 104 are each a data transfer device that transfers data between a client and another node and between nodes and are coupled to each other by the network 103. Details of a configuration of each of the network nodes 102 and 104 will be described later with reference to FIG. 2.

The network 103 uses a plurality of network nodes to transfer data to a specified destination address. It should be noted that the network 103 illustrated in FIG. 1 includes two network nodes 102 and 104, but may include more than two network nodes. The network 103 is a so-called 10 Gigabit Ethernet network, and transmits data encoded by 64B/66B encoding. In other words, data is transferred in the physical layer of the network 103 in 66-bit blocks, and the 66-bit block includes a 2-bit synchronization header (SyncHeader) and a 64-bit payload.

It should be noted that this invention can be applied to a case where a transferred block includes data which indicates an attribute of data included in the block and cannot be corrected by error correction, and hence the network 103 does not need to be a 10 Gigabit Ethernet network that transfers the block including the synchronization header.

Figure 2:
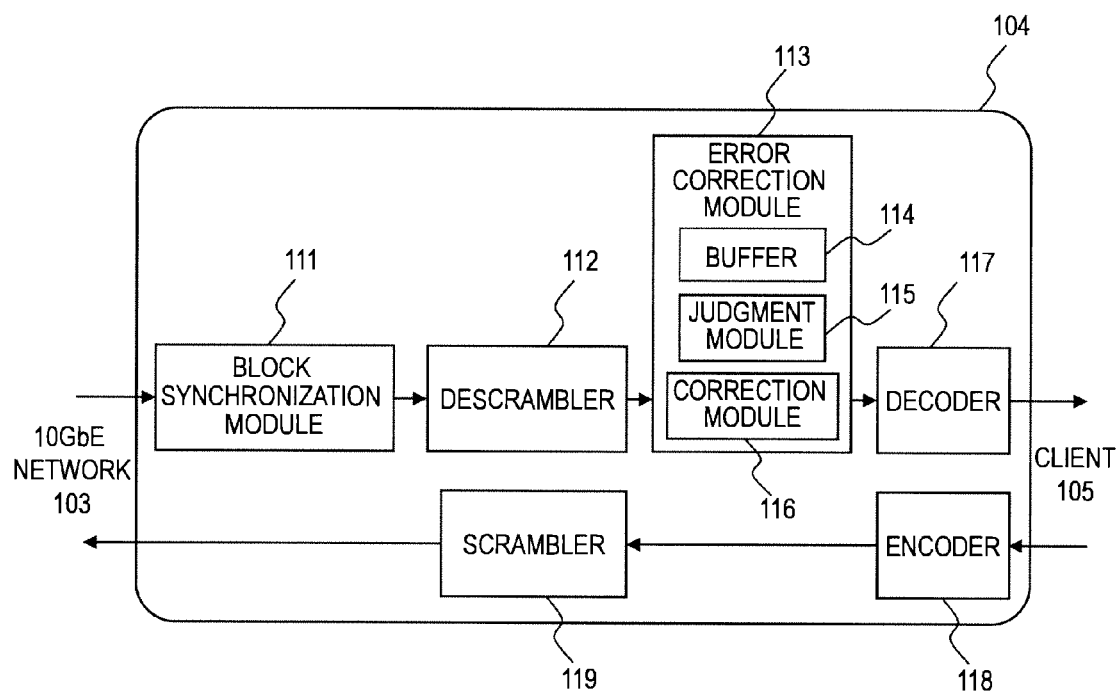
FIG. 2 is a block diagram illustrating configuration of a network node according to the first embodiment.

FIG. 2 is a block diagram illustrating the configuration of the network node 104 according to the first embodiment.

The network node 104 includes a block synchronization module 111, a descrambler 112, an error correction module 113, a decoder 117, an encoder 118, and a scrambler 119.

The block synchronization module 111 finds a "01" or "10" pattern of the synchronization header included every 66 bits in a serial data string transmitted from a network, and establishes synchronization of the block.

The descrambler 112 performs a descrambling processing on the 64-bit payload of the block.

If the synchronization header of the block is corrupt, the error correction module 113 estimates a correct value of the synchronization header and corrects the synchronization header.

Specifically, if the synchronization header of the block is corrupt, the error correction module 113 judges whether or not the synchronization headers of preceding and succeeding blocks satisfy a condition for allowing correction of the synchronization header of the intermediate block. Then, if the condition for allowing the correction is satisfied, the error correction module 113 references values of the synchronization headers of the preceding and succeeding blocks to thereby estimate the correct value of the synchronization header of the inter mediate block and correct the synchronization header of the intermediate block into the estimated value.

Hence, the error correction module 113 includes a buffer 114 for temporarily storing at least the preceding and succeeding blocks, a judgment module 115 for judging whether or not the synchronization headers of the preceding and succeeding blocks satisfy the condition for allowing the correction of the synchronization header of the intermediate block, and a correction module 116 for correcting the synchronization header of the inter mediate block into the value estimated from the synchronization headers of the preceding and succeeding blocks. Details of a processing executed by the error correction module 113 will be described later with reference to FIG. 4.

The decoder 117 extracts the payload from the block and decodes the payload into 64-bit (8-byte) data.

The encoder 118 encodes the 64-bit (8-byte) data into a 66-bit block by adding the synchronization header thereto.

The scrambler 119 performs a scrambling processing on the payload data of the block. By the scrambling processing, the data is adjusted so that the data to be transferred has a disparity of zero.

The network node 104 includes an interface (port) for transmitting/receiving data, a routing module for deciding the port for outputting the data, a processor for controlling an operation of the network node, and a memory for storing a program executed by the processor and data necessary for execution of the program.

The above description is directed to the network node 104, but the network node 102 has the same configuration and functions.

Figure 3A:
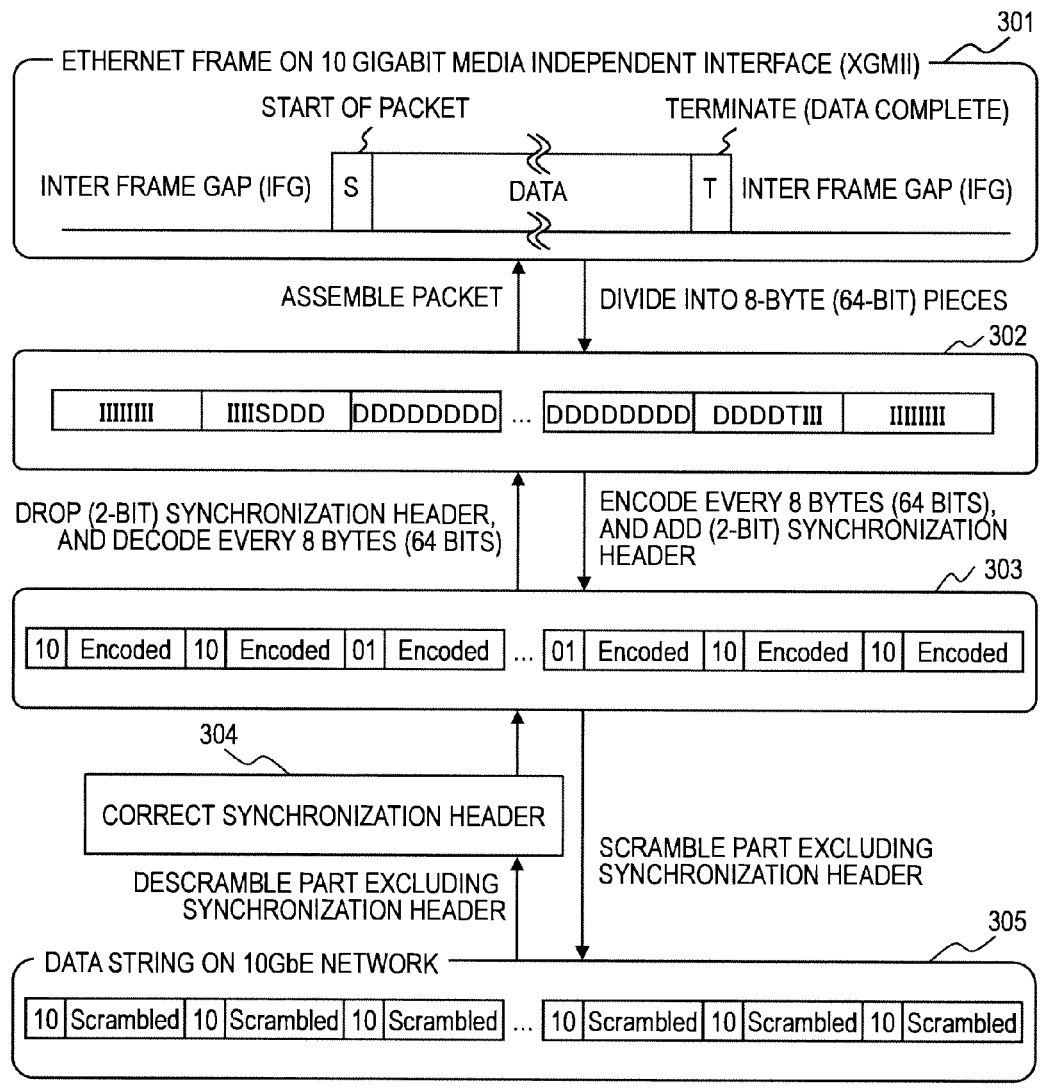
FIG. 3A is a diagram illustrating conversions between an Ethernet frame on 10 Gigabit Media Independent Interface and a data string on 10 Gigabit Ethernet according to the first embodiment.

FIG. 3A is a diagram illustrating conversions between an Ethernet frame on 10 Gigabit Media Independent Interface (XGMII) and a data string on 10 Gigabit Ethernet.

A data string 305 on 10 Gigabit Ethernet is generated as follows. An Ethernet frame 301 having a predetermined length on XGMII is divided into pieces of 8-byte data, and a 2-bit synchronization header is added to each piece of 8-byte data obtained by the dividing, thereby generating 66-bit blocks to be transferred on the 10 Gigabit Ethernet network.

Specifically, the Ethernet frame 301 on XGMII is provided with an 8-bit start code (S) in its head, an 8-bit termination code (T) in its end, and a data area between the start code and the termination code. Further, an interframe gap (IFG) is provided between frames.

The encoder 118 divides the Ethernet frame 301 into pieces of 8-byte data (302). At this time, the start code can be allocated to the first or fifth byte in the 8-byte data. In other words, the 8-byte data including the start code is represented by "SDDDDDDD" or "IIIISDDD".

Then, the 8-byte data obtained by the dividing is encoded according to a predetermined rule, after which the 2-bit synchronization header is added thereto (303). If the 8-byte data is user data, the synchronization header "01" is added thereto, and if the 8-byte data is data including a control code, the synchronization header "10" is added thereto.

After that, the data corresponding to the payload other than the synchronization header is scrambled to generate the data string 305 on 10 Gigabit Ethernet.

On the other hand, the data string 305 on 10 Gigabit Ethernet has the encoded data restored by the descrambling processing. After that, it is judged whether or not the synchronization header is corrupt, and the corrupt synchronization header is recovered (304 and 303). The processing for correcting the synchronization header will be described later with reference to FIG. 4 and FIG. 5. The processing for correcting the synchronization header may be implemented by a logic circuit, or may be implemented by the processor executing the program stored in the memory.

The synchronization header is removed from the data with the synchronization header recovered to generate the 8-byte data, and is decoded every 8 bytes (302). After that, the decoded pieces of data are combined to assemble a packet to restructure the Ethernet frame 301.

Figure 3B:
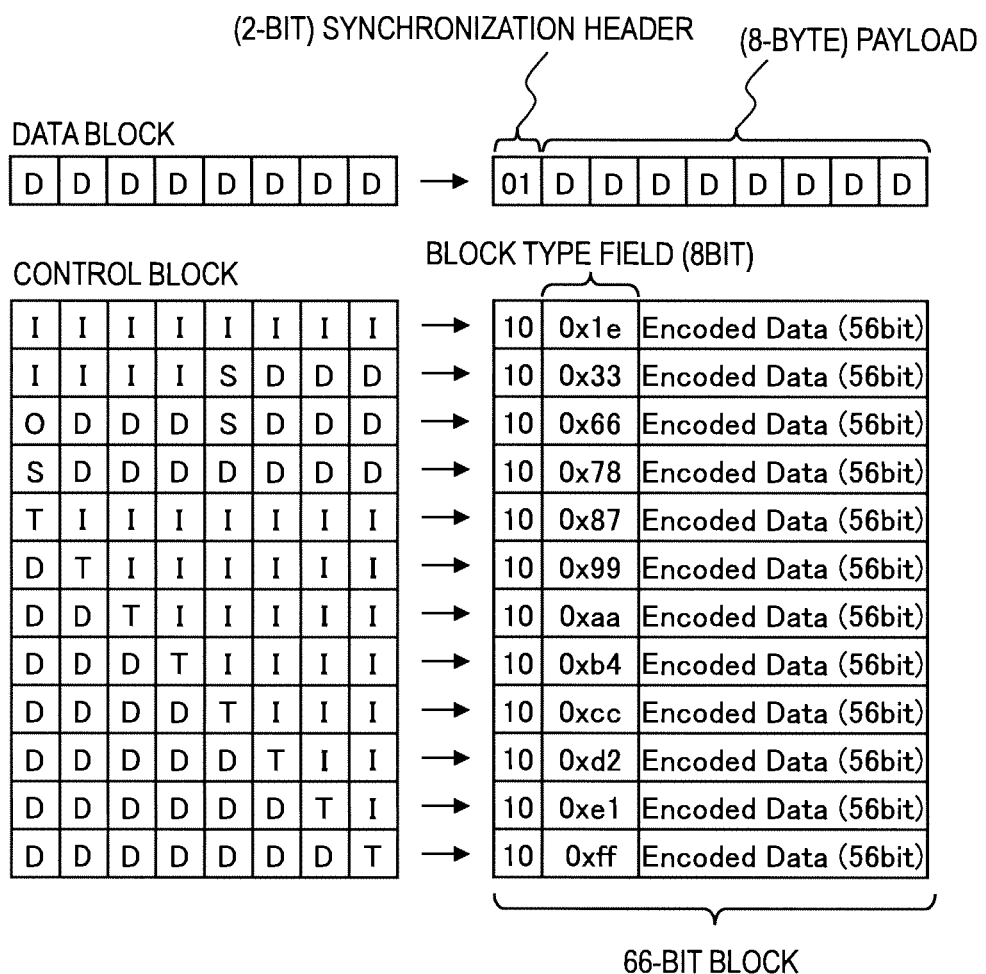
FIG. 3B is a diagram illustrating an example of encoding performed by an encoder according to the first embodiment.

FIG. 3B is a diagram illustrating an example of the encoding performed by the encoder 118.

As described above, in a case where the 8-byte payload includes only user data (D), the block is a data block with the synchronization header being "01". On the other hand, in a case where the 8-byte payload includes at least one of the control codes (such as S, T, and I), the block is a control block with the synchronization header being "10".

In the case of the control block, an 8-bit block type field (BlockTypeField) is provided to the head of the payload (in other words, immediately after the synchronization header).

The BlockTypeField indicates a method of encoding the user data (D) included in the block. Namely, the types, number, and positions of the control codes included in the block are determined by the value of the BlockTypeField.

Figure 4:
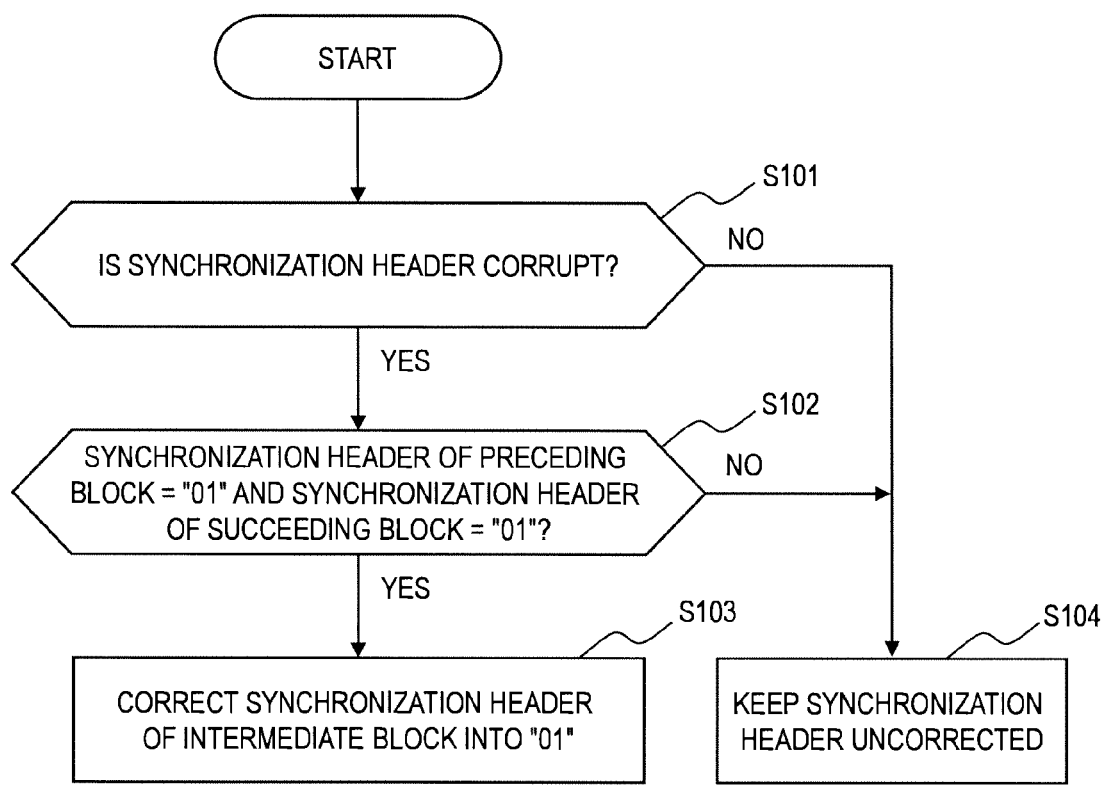
FIG. 4 is a flowchart of an error correction processing according to the first embodiment.

FIG. 4 is a flowchart of an error correction processing according to the first embodiment, and the error correction processing is executed by the error correction module 113. It should be noted that the error correction module 113 may function by the logic circuit, or may function by the processor included in the network node executing the program stored in the memory. Further, the error correction processing is executed after the synchronization of the block is established by the block synchronization module 111 and the descrambling is completed by the descrambler 112.

First, it is judged with reference to the value of the synchronization header whether or not the synchronization header is corrupt (S101). Specifically, the correct synchronization header is "01" or "10", and hence it can be judged that the synchronization header is corrupt if the synchronization header "00" or "11".

Subsequently, the synchronization headers are extracted from the preceding and succeeding blocks stored in the buffer 114, and it is judged whether or not the value of the synchronization header of the intermediate block can be estimated from the extracted synchronization headers (S102). In other words, it is judged whether or not the synchronization headers of the preceding and succeeding blocks satisfy the condition for allowing the correction of the synchronization header of the intermediate block. Specifically, the condition for allowing the correction of the synchronization header of the intermediate block is satisfied if the synchronization header of the preceding block is "01" and the synchronization header of the succeeding block is "01", and it is possible to estimate and correct the value of the synchronization header of the intermediate block.

If the condition is satisfied as a result of the judgment, it is estimated that the value of the synchronization header of the intermediate block is "01", and the synchronization header of the intermediate block is corrected into "01" (S103).

This is because, as illustrated in FIG. 3B, one block does not include both the code "S" indicating the start of the packet and the code "T" indicating the termination of the packet. Further, if the synchronization header of the block is "01", the block is a data block including only user data as the payload. Accordingly, it is possible to estimate that the intermediate block is the data block and to correct the synchronization header of the intermediate block into "01".

On the other hand, if one of the synchronization headers of the preceding and succeeding blocks is not "01", the value of the synchronization header of the intermediate block cannot be estimated, and hence the synchronization header is kept uncorrected (S104). It should be noted that in a case where a corrupt synchronization header is not corrected, an Ethernet frame including data of the block cannot be built correctly. Hence, data transmission control is performed in the upper layers (the data link layer, the network layer, and the like) so that the Ethernet frame including the intermediate block is retransmitted.

Figure 5:
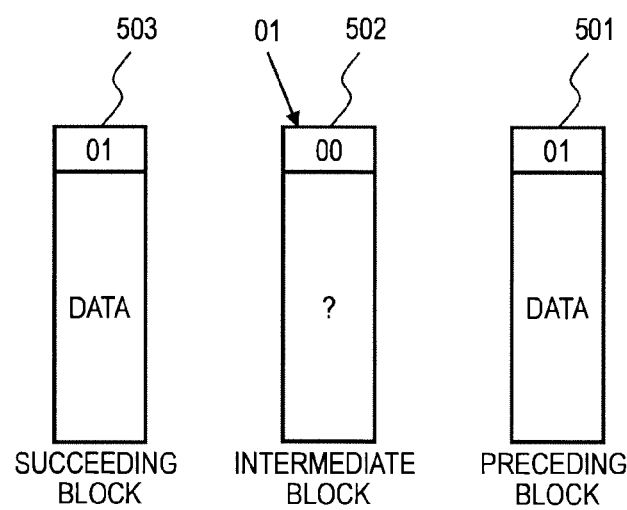
FIG. 5 is a diagram to describe correction of a synchronization header in the first embodiment.

Next, FIG. 5 is referenced to describe the correction of the synchronization header of the inter mediate block.

A synchronization header 502 of the intermediate block to be processed is "00", and hence it is judged in Step S101 that the synchronization header 502 is incorrect. Therefore, synchronization headers 501 and 503 of the preceding and succeeding blocks stored in the buffer are referenced. In this case, the synchronization headers 501 and 503 of the preceding and succeeding blocks, respectively, are both "01", and hence it can be estimated from the synchronization headers 501 and 503 of the preceding and succeeding blocks that the synchronization header of the intermediate block is "01".

In other words, in this embodiment, 66-bit blocks generated by dividing the Ethernet frame having a predetermined length are transferred between network nodes, and hence the transferred block inherits property (continuity with the data of the preceding and succeeding blocks) of the Ethernet frame before being divided as it is. Hence, the data included in blocks, in particular, the control codes exhibit regularity in arrangement thereof. In the embodiments of this invention, it is judged by focusing on the regularity which of the data block and the control block the block is, and the corrupt synchronization header is corrected.

In the first embodiment, the synchronization header 502 of the intermediate block can be thus corrected into "01".

As described above, according to the first embodiment of this invention, if the synchronization header of the intermediate block is not a correct value, it is judged based on the synchronization headers of the preceding and succeeding blocks whether or not the value of the synchronization header of the intermediate block can be estimated. Then, if the condition for allowing the estimation of the value of the synchronization header of the intermediate block is satisfied, the synchronization header of the intermediate block is corrected so that the intermediate block is consistent with the preceding and succeeding blocks. Hence, the number of discarded blocks with corrupt synchronization headers decreases, which can decrease the frequency of retransmission of packets. Further, the retransmission of packets decreases in frequency, which can suppress an increase in traffic on a transmission path. Further, by suppressing an increase in traffic, it is possible to reduce power consumption of the network node.

Second Embodiment

Next described is a second embodiment of this invention.

In the above-mentioned first embodiment, the synchronization headers of the preceding and succeeding blocks are used to correct the synchronization header of the intermediate block, while in the second embodiment, the synchronization headers and the block type fields of the preceding and succeeding blocks are used. Further, the block type field of the intermediate block may be used in an auxiliary manner.

Configuration of a system of the second embodiment and hardware configuration of network nodes of the second embodiment are the same as those of the above-mentioned first embodiment. In the second embodiment, the same components and the same processing steps as those of the above-mentioned first embodiment are denoted by the same reference numerals and symbols, and description thereof is omitted.

The network node of the second embodiment is different from the network node of the above-mentioned first embodiment in the function of the error correction module 113.

Namely, if the synchronization header of the block is corrupt, the error correction module 113 of the second embodiment references the values of the synchronization headers and the block type fields of the block and the preceding and succeeding blocks to thereby estimate the correct value of the synchronization header of the inter mediate block and correct the synchronization header.

Specifically, if the synchronization header of the block is corrupt, the error correction module 113 judges whether or not the synchronization headers and the block type fields of the preceding and succeeding blocks satisfy the condition for allowing the correction of the synchronization header of the intermediate block. Then, if the condition for allowing the correction is satisfied, the synchronization header of the intermediate block is corrected into the value estimated from the synchronization headers and the block type fields of the preceding and succeeding blocks.

Here, the block type field represents information indicating a type of the data included in the block, and is a data area allocated to the first 8 bits of the payload (1 byte immediately after the synchronization header) if the 66-bit block to be transferred is a control block. As illustrated in FIG. 3B, the block type field indicates the number of bytes and position of user data included in the data to be transferred and the contents, number, and positions of the control codes. In other words, it is possible to know the control code included in the control block based on the 8-bit data immediately after the synchronization header if the synchronization header is "10".

Further, in the second embodiment, the judgment module 115 judges whether or not the synchronization headers and the block type fields of the preceding and succeeding blocks satisfy the condition for allowing the correction of the synchronization header of the intermediate block. The correction module 116 corrects the synchronization header of the intermediate block into the value estimated from the synchronization headers and the block type fields of the preceding and succeeding blocks.

Figure 6:
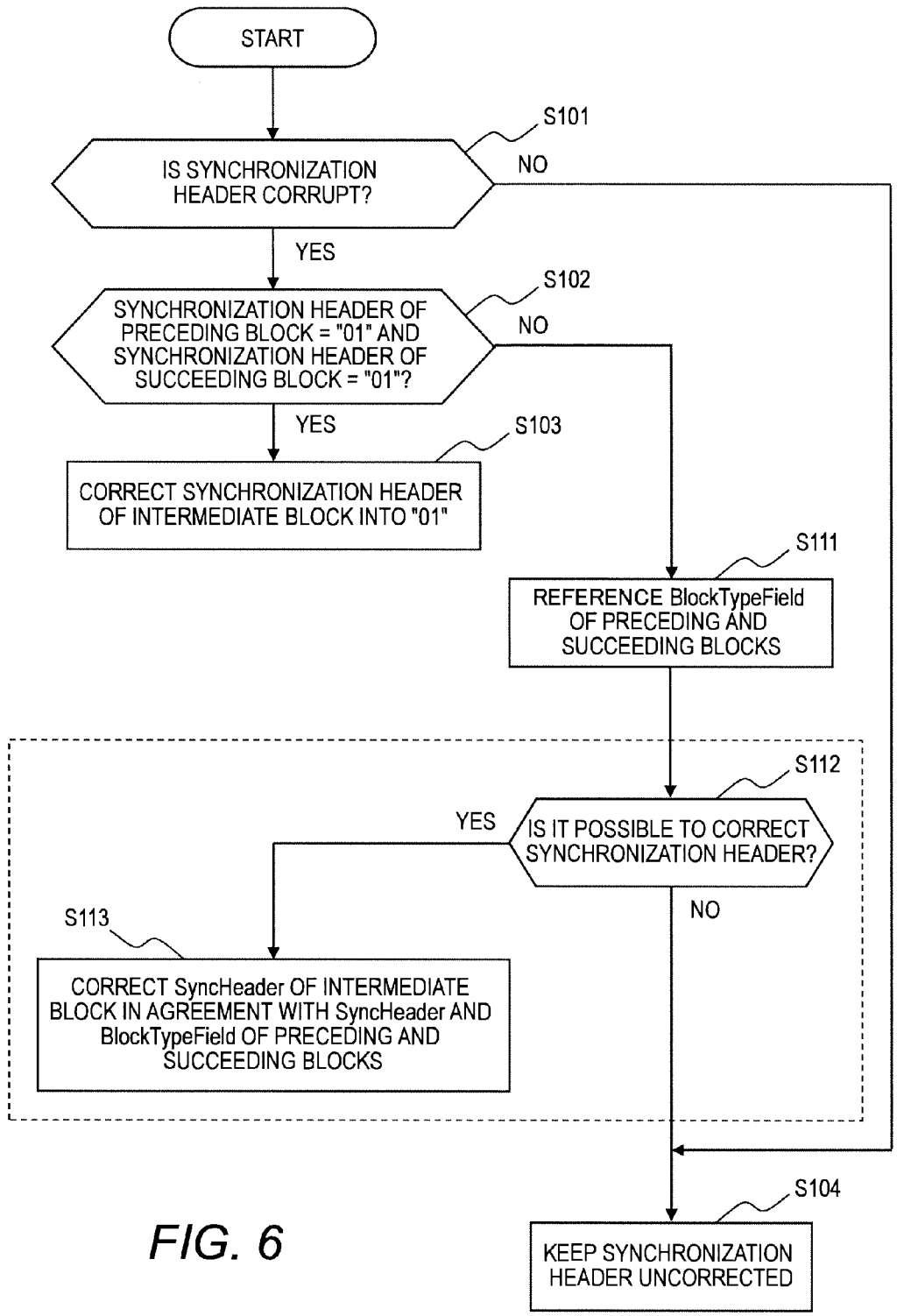
FIG. 6 is a flowchart of an error correction processing according to a second embodiment.

FIG. 6 is a flowchart of an error correction processing according to the second embodiment, and the error correction processing is executed by the error correction module 113. It should be noted that, as in the above-mentioned first embodiment, the error correction module 113 may function by the logic circuit, or may function by the processor included in the network node executing the program stored in the memory. Further, the error correction processing is executed after the synchronization of the block is established by the block synchronization module 111 and the descrambling is completed by the descrambler 112.

First, in the same manner as in the above-mentioned first embodiment, it is judged whether or not the synchronization header is corrupt (S101), it is judged whether or not the synchronization header of the block can be estimated from the synchronization headers of the preceding and succeeding blocks (S102), and if it can be estimated, the synchronization header of the intermediate block is corrected into the estimated value (S103).

On the other hand, if it is judged in Step S102 that the synchronization headers of the preceding and succeeding blocks do not satisfy the condition for allowing the correction of the synchronization header of the intermediate block, the block type fields of the preceding and succeeding blocks are referenced (S111) to judge from the block type fields of the preceding and succeeding blocks whether or not the value of the synchronization header of the intermediate block can be estimated, in other words, whether or not the synchronization headers and the block type fields of the preceding and succeeding blocks satisfy the condition for allowing the correction of the synchronization header of the intermediate block (S112). As a result, if the value of the synchronization header of the intermediate block can be estimated, the value of the synchronization header of the intermediate block is estimated from the synchronization headers and the block type fields of the preceding and succeeding blocks, and the SyncHeader of the intermediate block is corrected into the estimated value (S113).

Figure 7:
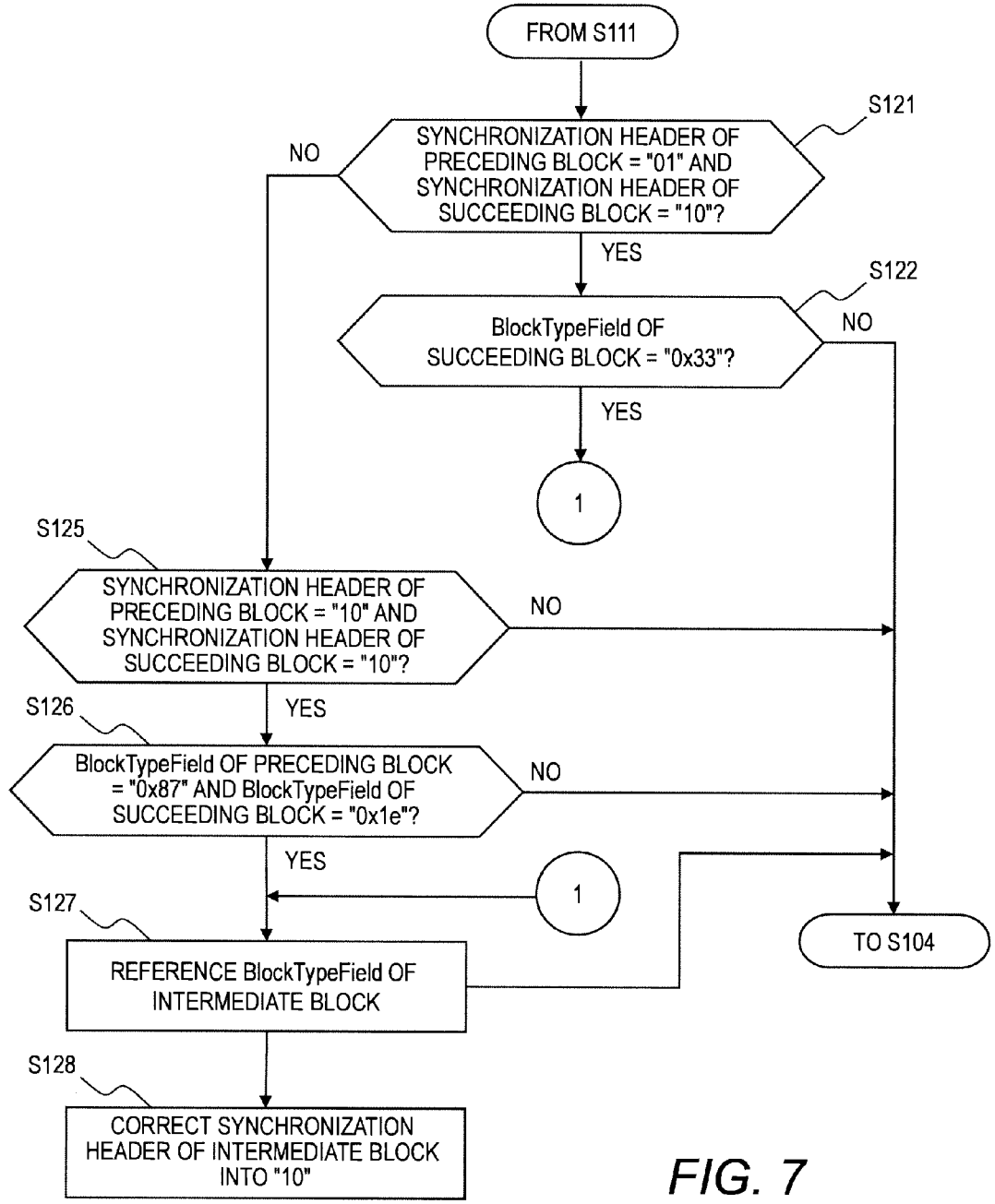
FIG. 7 is a flowchart illustrating details of the error correction processing according to the second embodiment.

It should be noted that FIG. 7 and FIG. 11 are referenced to describe specific contents of the processing of Steps S112 and S113. The processing for correcting the synchronization header may be implemented by a logic circuit, or as in the above-mentioned first embodiment, may be implemented by the processor executing the program stored in the memory.

On the other hand, it is judged in Step S112 that the condition for allowing the correction of the synchronization header of the intermediate block is not satisfied, the synchronization header of the intermediate block is kept uncorrected (S104). In this case, in the same manner as in the above-mentioned first embodiment, an Ethernet frame including data of the block cannot be built correctly, and hence the transmission control is performed so that the Ethernet frame including the intermediate block is retransmitted.

FIG. 7 is a flowchart illustrating the details of the error correction processing according to the second embodiment (S112 and S113 of FIG. 6).

In the error correction processing of the second embodiment (FIG. 6), if it is judged that the synchronization header of the intermediate block cannot be corrected by the synchronization headers of the preceding and succeeding blocks, the block type fields of the preceding and succeeding blocks are referenced (S111).

After that, it is judged whether or not the synchronization header of the preceding block is "01" and the synchronization header of the succeeding block is "10" (S121). If the synchronization header of the preceding block is "01" and the synchronization header of the succeeding block is "10", it is further judged whether or not the block type field of the succeeding block is "0x33" (S122).

As a result, if the block type field of the succeeding block is "0x33" with the synchronization header of the preceding block being "01" and the synchronization header of the succeeding block being "10", the condition for allowing the correction of the synchronization header of the intermediate block is satisfied. In other words, in this case, the succeeding block includes a frame head (start code S), and hence it can be estimated that the intermediate block to be processed includes a frame end (termination code T) and is a control block. Accordingly, the procedure advances to Step S127 to correct the synchronization header of the intermediate block.

On the other hand, if the synchronization header of the preceding block is not "01" or the synchronization header of the succeeding block is not "10", the procedure advances to Step S125 to determine whether another condition is satisfied.

It is judged in Steps S125 and S126 whether or not the block type field of the preceding block is "0x87" and the block type field of the succeeding block is "0x1e" with the synchronization header of the preceding block being "10" and the synchronization header of the succeeding block being "10".

As a result, if the block type field of the preceding block is "0x87" and the block type field of the succeeding block is "0x1e" with the synchronization header of the preceding block being "10" and the synchronization header of the succeeding block being "10", the condition for allowing the correction of the synchronization header of the intermediate block is satisfied. In this case, the preceding block includes the frame end (termination code T), and the succeeding block includes IFG data. Since the intermediate block to be processed is sandwiched between the preceding and succeeding IFG data, it can be estimated that the intermediate block to be processed includes IFG data and is a control block. Therefore, the procedure advances to Step S127 to correct the synchronization header of the intermediate block.

In Step S127, the block type field of the intermediate block to be processed is referenced, and it is judged whether or not the synchronization header of the intermediate block is to be corrected. In other words, it is judged whether or not the synchronization header of the intermediate block estimated from the synchronization headers and the block type fields of the preceding and succeeding blocks is consistent with the block type field of the intermediate block. This is because the block type field can assume only a predetermined value if the synchronization header is "10".

As a result, if the estimated synchronization header of the intermediate block is consistent with the block type field of the intermediate block, it is confirmed that the value of the estimated synchronization header of the intermediate block is correct, and hence the procedure advances to Step S128 to correct the synchronization header of the intermediate block into "10".

On the other hand, if the estimated synchronization header of the intermediate block is not consistent with the block type field of the intermediate block, the value of the estimated synchronization header of the intermediate block or the value of the block type field thereof may be incorrect. In this case, the following two processings are conceivable.

(1) One processing corrects the synchronization header. If the estimated synchronization header of the intermediate block is not consistent with the block type field of the intermediate block, the probability that the correction of the synchronization header is correct is low. However, in order to increase the probability that the block can be correctly decoded and to reduce a packet discard rate, the synchronization header is desirably corrected even if the probability that the correction of the synchronization header is correct is low.

(2) Another processing does not correct the synchronization header. If the estimated synchronization header of the intermediate block is not consistent with the block type field of the intermediate block, the probability that the correction of the synchronization header is correct is low, and hence the control is desirably performed so that the frame is retransmitted in the upper layers without correcting the synchronization header in order to avoid a data error. In other words, the synchronization header is desirably not corrected in such a case in order to place a high priority on the accuracy of the data.

The above-mentioned two processings may be changed over according to the quality of the data to be transferred, in other words, according to which of a data transfer speed and the accuracy of the data the priority is to be placed on. Further, those two processings may be set selectively for each combination of the synchronization headers and the block type fields of the preceding and succeeding blocks from which it is judged that the synchronization header of the intermediate block can be corrected.

It should be noted that the processing of Step S127 is optional, and hence the block type field of the intermediate block is not necessarily referenced to judge whether or not the synchronization header of the intermediate block is to be corrected.

After that, in the case of correcting the synchronization header, the synchronization header of the intermediate block to be processed is corrected into "10" (S128).

On the other hand, if the values of the synchronization headers and the block type fields of the preceding and succeeding blocks agree with none of entries, a correction candidate for the synchronization header cannot be obtained, and hence it is judged that the synchronization header of the intermediate block to be judged is uncorrectable. Specifically, if the judgment of Step S122 results in "NO", if the judgment of Step S125 results in "NO", or if the judgment of Step S126 results in "NO", the procedure advances to Step S104 to keep uncorrected the synchronization header of the intermediate block to be processed.

Figure 8:
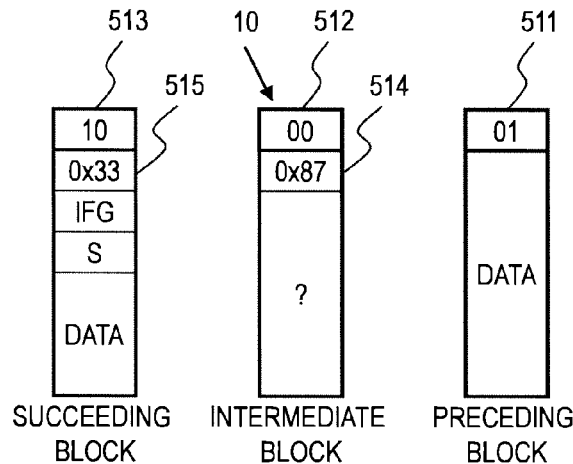
FIG. 8 is a diagram to describe correction of a synchronization header in the second embodiment.
Figure 9:
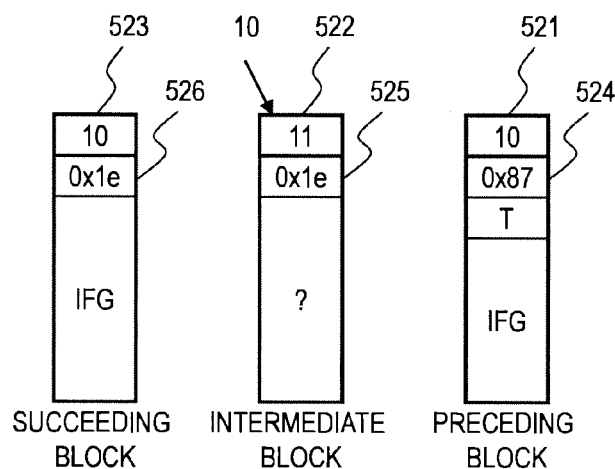
FIG. 9 is a diagram to describe correction of a synchronization header in the second embodiment.
Figure 10:
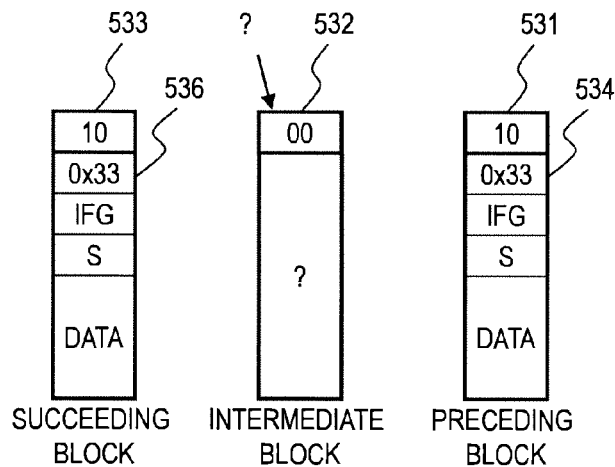
FIG. 10 is a diagram to describe a case where the value of a synchronization header cannot be corrected in the second embodiment.

Next, with regard to the correction of the synchronization header of the intermediate block, FIG. 8 and FIG. 9 are referenced to describe cases where the value of the synchronization header of the intermediate block can be estimated from the synchronization headers and the block type fields of the preceding and succeeding blocks, and FIG. 10 is referenced to describe a case where the value of the synchronization header of the intermediate block cannot be estimated from the synchronization headers and the block type fields of the preceding and succeeding blocks.

In the case illustrated in FIG. 8, a synchronization header 512 of an intermediate block to be processed is "00", and hence it is judged in Step S101 that the synchronization header 512 is incorrect. Therefore, synchronization headers 511 and 513 of the preceding and succeeding blocks which are stored in the buffer are referenced. Because the synchronization header 511 of the preceding block is "01" and the synchronization header 513 of the succeeding block is "10", the value of the synchronization header of the intermediate block cannot be estimated from the synchronization headers 511 and 513 of the preceding and succeeding blocks (S102 and S121). Therefore, a block type field 515 of the succeeding block is referenced. In the case illustrated in FIG. 8, the preceding block is the data block with the synchronization header being "01", and hence the user data is stored in a location to which the block type field should be allocated.

As a result, since the block type field 515 of the succeeding block is "0x33", it turns out that the succeeding block includes the frame head (start code S) (S122). Hence, it can be estimated that the intermediate block to be processed includes the frame end (termination code T) and is the control block. Hence, the synchronization header 512 of the intermediate block can be corrected into "10".

In the case illustrated in FIG. 8, if the block type field of the intermediate block is "0x87", the result of estimating the value of the synchronization header is correct, and hence the synchronization header is corrected. On the other hand, even if the block type field of the intermediate block is not "0x87", the processing for correcting the synchronization header or keeping the synchronization header uncorrected is selectively executed (S127).

In the case illustrated in FIG. 9, a synchronization header 522 of the intermediate block to be processed is "11", and hence it is judged in Step S101 that the synchronization header 522 is incorrect. Therefore, synchronization headers 521 and 523 of the preceding and succeeding blocks, respectively, which are stored in the buffer are referenced. Because the synchronization header 521 of the preceding block is "10" and the synchronization header 523 of the succeeding block is "10", the value of the synchronization header of the intermediate block cannot be estimated from the synchronization headers 521 and 523 of the preceding and succeeding blocks (S102 and S125). Therefore, block type fields 524 and 526 of the preceding and succeeding blocks are referenced.

As a result, since the block type field 524 of the preceding block is "0x87", it turns out that the preceding block includes the frame end (termination code T) and IFG data. Further, in consideration of the block type field 526 of the succeeding block being "0x1e", it turns out that the succeeding block includes IFG data. Hence, it can be estimated that the intermediate block to be processed includes IFG data and is the control block because it is sandwiched between the preceding and succeeding IFG data. Hence, the synchronization header 522 of the intermediate block can be corrected into "10".

In the case illustrated in FIG. 9, if the block type field of the intermediate block is "0x1e", the result of estimating the value of the synchronization header is correct, but even if the block type field of the intermediate block is not "0x1e", the processing for correcting the synchronization header or keeping the synchronization header uncorrected is selectively executed (S127).

In the case illustrated in FIG. 10, a synchronization header 532 of a intermediate block to be processed is "00", and hence it is judged in Step S101 that the synchronization header 532 is incorrect. Therefore, synchronization headers 531 and 533 of the preceding and succeeding blocks stored in the buffer are referenced. Because the synchronization header 531 of the preceding block is "10" and the synchronization header 533 of the succeeding block is "10", the condition for allowing the estimation of the value of the synchronization header of the intermediate block from the synchronization headers 531 and 533 of the preceding and succeeding blocks is not satisfied (S102 and S125). Therefore, block type fields 534 and 536 of the preceding and succeeding blocks are referenced.

As a result, since the block type field 536 of the succeeding block is "0x33", it turns out that the succeeding block includes the frame head (start code S). Further, since the block type field 534 of the preceding block is "0x33", it turns out that the preceding block includes the frame head (start code S) (S126).

At this time, a block including a termination code (T) should be present between the two blocks including the start code (S). However, the intermediate block includes the start code (S) if the referencing of the block type field of the intermediate block results in the value of, for example, 0x33, and hence consistency with the preceding and succeeding blocks cannot be obtained even if the synchronization header of the intermediate block is corrected. Accordingly, the synchronization header 532 of the intermediate block is not corrected (S127).

Modified Example

In the error correction processing of the second embodiment, it can be judged whether or not the synchronization header of the intermediate block can be corrected not only by the logic illustrated in FIG. 7 but also by finding a specific combination from the synchronization headers and the block type fields of the preceding and succeeding blocks. Next, such a modified example is described.

FIG. 11 is a diagram illustrating an error correction table 200 according to the modified example of the second embodiment.

The error correction table 200 according to the modified example of the second embodiment includes a synchronization header 201 of the preceding block, a block type field 202 of the preceding block, a synchronization header 203 of the succeeding block, a block type field 204 of the succeeding block, a block type field 205 of the intermediate block, and a correction candidate 206 for the synchronization header. The error correction table 200 is stored in the memory of the network node, and is referenced by the judgment module 115. It should be noted that as described later, the error correction table 200 does not need to include the block type field 205 of the intermediate block.

The synchronization header 201 of the preceding block indicates the value of the synchronization header of the block received immediately before the intermediate block to be processed. The block type field 202 of the preceding block indicates the value of the block type field of the block received immediately before the intermediate block to be processed. The synchronization header 203 of the succeeding block indicates the value of the synchronization header of the block received immediately after the intermediate block to be processed. The block type field 204 of the succeeding block indicates the value of the block type field of the block received immediately after the intermediate block to be processed. The block type field 205 of the intermediate block indicates the value of the block type field of the intermediate block to be processed. The correction candidate 206 for the synchronization header indicates the correction candidate for the synchronization header of the intermediate block to be processed. It should be noted that the sign "-" in each field means that any value in the field satisfies the condition.

In this embodiment, if the synchronization header of the intermediate block to be processed is corrupt, it is judged whether or not the synchronization header and the block type field of the preceding block and the synchronization header and the block type field of the succeeding block which are stored in the buffer respectively agree with the synchronization header 201 of the preceding block, the block type field 202 of the preceding block, the synchronization header 203 of the succeeding block, and the block type field 204 of the succeeding block.

If the values of the synchronization headers and the block type fields of the preceding and succeeding blocks agree with any one of the entries, the synchronization headers and the block type fields of the preceding and succeeding blocks satisfy the condition for allowing the estimation of the value of the synchronization header of the intermediate block, and it is estimated that the synchronization header of the intermediate block is the correction candidate 206 for the synchronization header of this entry. Therefore, the correction candidate 206 for the synchronization header is acquired from the error correction table 200, and the synchronization header of the intermediate block is corrected into the correction candidate 206 for the synchronization header.

In this case, the block type field 205 of the intermediate block may be referenced. If the synchronization headers and the block type fields of the preceding and succeeding blocks agree with any one of the entries and the block type field of the intermediate block does not agree with the entry, the probability that the correction of the synchronization header of the intermediate block can be corrected correctly is low, but the synchronization header may be corrected or may be kept uncorrected.

On the other hand, if the values of the synchronization headers and the block type fields of the preceding and succeeding blocks agree with none of the entries, the synchronization headers and the block type fields of the preceding and succeeding blocks do not satisfy the condition for allowing the estimation of the value of the synchronization header of the intermediate block, and the correction candidate for the synchronization header cannot be obtained, and hence it is judged that the synchronization header of the intermediate block to be judged is uncorrectable.

An entry 211 is an entry corresponding to a processing (S101 to S103 of FIG. 6) for judging whether or not the synchronization header of the intermediate block can be corrected only by the synchronization headers of the preceding and succeeding blocks without reference to the block type field. In other words, the error correction table 200 can be used not only for the case where the judgment is made based on the values of the block type fields of the preceding and succeeding blocks but also for the case where the judgment is made only based on the synchronization headers of the preceding and succeeding blocks.

Specifically, the entry 211 allows the correction candidate for the synchronization header of the intermediate block to be determined as "01" if as illustrated in FIG. 5, the synchronization headers of the preceding and succeeding blocks are both "01".

Further, an entry 212 allows the correction candidate for the synchronization header of the intermediate block to be determined as "10" if, as illustrated in FIG. 8, the synchronization header of the preceding block is "01" and the synchronization header of the succeeding block is "10" with the block type field of the succeeding block being "0x33". In this case, if the block type field of the inter mediate block is "0x87", the result of estimating the value of the synchronization header is correct, but even if the block type field of the intermediate block is not "0x87", the processing for correcting the synchronization header or keeping the synchronization header uncorrected is selectively executed.

Further, an entry 213 allows the correction candidate for the synchronization header of the inter mediate block to be determined as "10" if, as illustrated in FIG. 9, the synchronization header of the preceding block is "10" with the block type field of the preceding block being "0x87" and the synchronization header of the succeeding block is "10" with the block type field of the succeeding block being "0x1e". In this case, if the block type field of the intermediate block is "0x1e", the result of estimating the value of the synchronization header is correct, but even if the block type field of the intermediate block is not "0x1e", the processing for correcting the synchronization header or keeping the synchronization header uncorrected is selectively executed.

Further, the error correction table 200 may be provided with a flag for deciding whether or not the synchronization header is to be corrected if the block type field of the inter mediate block is not correct, and it may be controlled for each entry whether or not the synchronization header is to be corrected. In this case, the flag may be settable by an administrator.

It should be noted that FIG. 7 to FIG. 11 illustrate examples of the combinations of the synchronization headers and the block type fields of the preceding and succeeding blocks, and according to the research conducted by the present inventors, several tens of kinds of combinations satisfy the condition for allowing the estimation of the value of the synchronization header of the intermediate block and allow the estimation of the value of the synchronization header of the intermediate block.

As described above, according to the second embodiment of this invention, if the value of the synchronization header of the intermediate block is not correct, based on the synchronization headers and the block type fields of the preceding and succeeding blocks, it is judged whether or not the value of the synchronization header of the intermediate block can be estimated. Then, if the condition for allowing the estimation of the value of the synchronization header of the intermediate block is satisfied, the synchronization header of the intermediate block is corrected so that the intermediate block is consistent with the preceding and succeeding blocks. Hence, in addition to the effect of the above-mentioned first embodiment, the synchronization header of the intermediate block can be corrected in more cases than that in the first embodiment.

(Implementation to MPLS Network)

Figure 12:
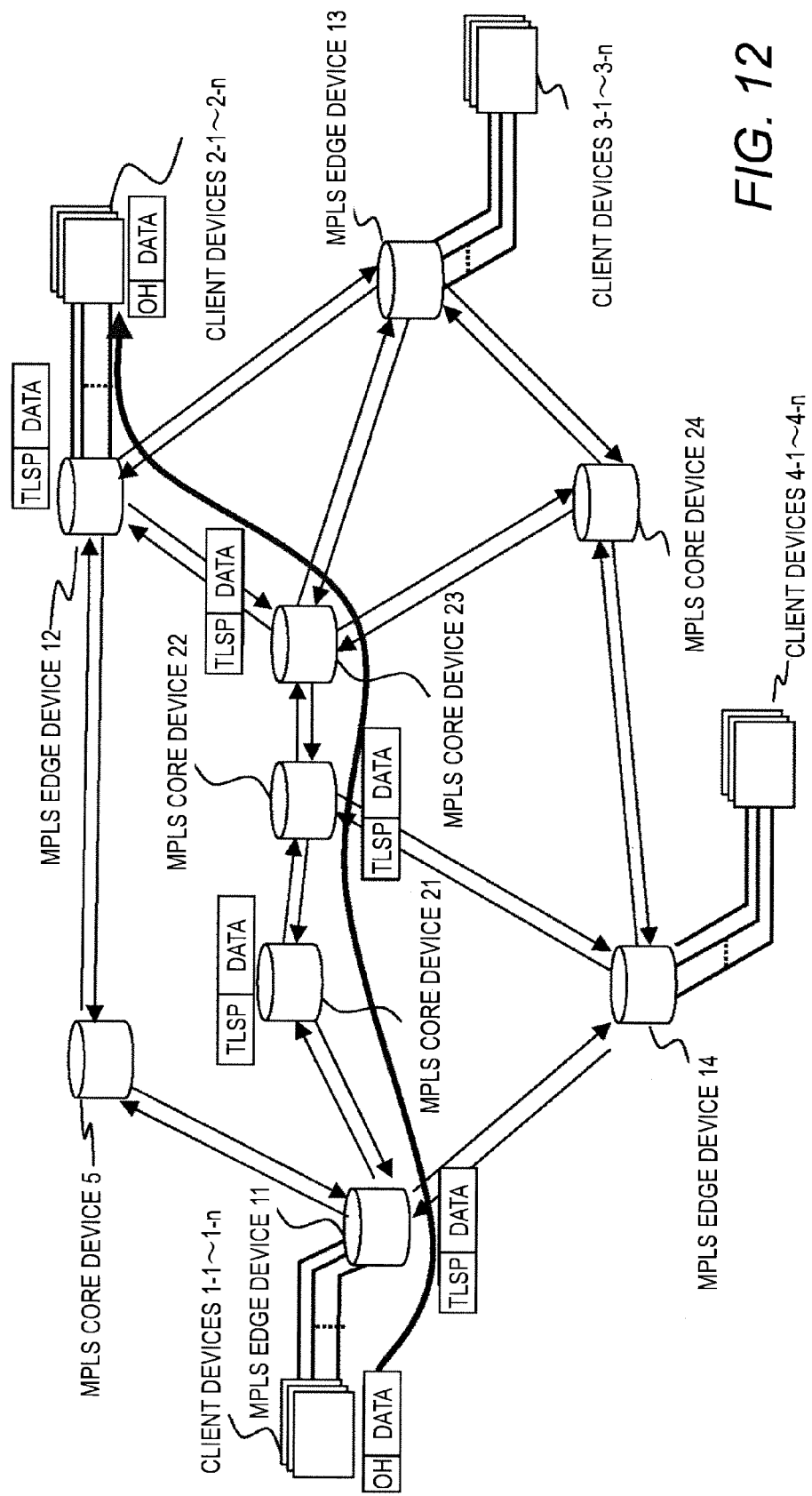
FIG. 12 is a diagram of an MPLS network to which this invention is applied.

FIG. 12 is an explanatory diagram of an MPLS network to which this invention is applied.

In a case of transferring the user data from a client device 1-1 to a client device 2-1, an MPLS edge device 11 receives the Ethernet frame transmitted from the client device 1-1, terminate the overhead (OH), extracts the user data, and identifies an MPLS edge device 12 to which the destination client device 2-1 is coupled. The OH includes an address (such as IP address or destination address) of the client device 2-1 being the destination. It should be noted that FIG. 12 illustrates an SDH/SONET signal for the user data as an example, but the same applies to various signals such as an Ethernet signal.

Then, the extracted user data is encapsulated by adding an MPLS label (TLSP) indicating an identified edge node to the user data. The encapsulation using the TLSP allows the packet to be transferred end to end within the MPLS network by MPLS core devices 21 to 23 within the MPLS network without reference to the destination of the client device 2-1 (hereinafter, referred to as "label switch").

In this case, after encapsulating the user data received from the client device 1-1 by using 64B/66B encoding, the MPLS edge device 11 converts the encapsulated user data into the 66-bit block, and transfers the 66-bit block to an MPLS core device 21. MPLS core devices 21 to 2n restructures the Ethernet frame from the 66-bit block transmitted from an MPLS device at the previous stage, identifies the next MPLS device by the MPLS label, converts the restructured Ethernet frame into the 66-bit block, and sends the 66-bit block to the MPLS device at the subsequent stage.

The MPLS edge device 12 restructures the Ethernet frame from the 66-bit block transmitted from an MPLS core device at the previous stage, terminates the TLSP, and transfers the user data to the client device 2-1.

As described above, when restructuring the Ethernet frame from the 66-bit block transmitted from the MPLS device at the previous stage, the MPLS device provided in the MPLS network correct the corrupt synchronization header of the 66-bit block based on the preceding and succeeding blocks.

While the present invention has been described in detail and pictorially in the accompanying drawings, the present invention is not limited to such detail but covers various obvious modifications and equivalent arrangements, which fall within the purview of the appended claims.

What is claimed is:

1. A data transfer device for transferring blocks generated by dividing a frame into pieces of data each having a first predetermined number of bits and adding a synchronization header having a second predetermined number of bits to each of the blocks, comprising:

a processing module configured to process an operation of the data transfer device;

a buffer for storing the blocks to be transferred; and an interface configured to receive and transmit data to and from the data transfer device, wherein:

the synchronization header is configured for synchronization of each of the blocks and has first information for identifying whether the respective block includes a control code other than user data;

wherein the blocks comprise a first block, a second block, and a third block that are successively transferred in the stated order;

the first block, the second block and the third block include a first synchronization header, a second synchronization header and a third synchronization header as the synchronization header, respectively; and the processing module is configured to:

acquire the first synchronization header, the second synchronization header, and the third synchronization header;

perform, in a case where a value of the first information of the second synchronization header is incorrect, a first judgment as to whether or not the value of the first information of the second synchronization header can be estimated based on the first synchronization header and the third synchronization header so that the second block is consistent with the first block and the third block;
judge, in a case where a value of the first information of the first synchronization header and a value of the first information of the third synchronization header is same, that the second synchronization header can be estimated in the first judgment; and
correct the second synchronization header into an estimated value of the first information.

2. The data transfer device according to claim 1, wherein:
each of the blocks contains second information indicating a type of data included therein; and
the processing module is configured to:
perform, in a case where it is judged in the first judgment that the value of the first information of the second synchronization header cannot be estimated, a second judgment as to whether or not the value of the first information of the second synchronization header can be estimated based on the second information included in the first block and the second information included in the third block; and
correct the second synchronization header based on a result of the second judgment so as to be consistent with the first block and the third block.

3. The data transfer device according to claim 2, wherein the second information indicating the type of the data is located in a head position of a data part of each of the blocks.

4. The data transfer device according to claim 1, wherein the data transfer device is configured to:
transfer the frame encapsulated by using a Multiprotocol Label Switching (MPLS) label;
generate, in a case of being provided at an entrance edge to an MPLS network, the blocks after adding the MPLS label to the frame; and
remove, in a case of being provided at an exit edge from the MPLS network, the MPLS label from the frame after attempting to correct at least one of the synchronization headers.

5. The data transfer device according to claim 1, wherein the processing module is configured to correct the first information of the second synchronization header into the value indicating that the second block contains only user data in a case where the first information of the first synchronization header indicates that the first block contains only the user data and the first information of the third synchronization header indicates that the third block contains only the user data.

6. A data transfer system, comprising at least two nodes, for transferring data therebetween, wherein:
each of the at least two nodes includes:
a processing module configured to process an operation of the node thereof;
a buffer for storing blocks to be transferred; and
an interface configured to receive and transmit data to and from the node thereof;
each of the at least two nodes is configured to transfer the blocks generated by dividing a frame into pieces of data each having a first predetermined number of bits and adding a synchronization header having a second predetermined number of bits to each of the pieces of data obtained by the dividing;
the synchronization header is configured for synchronization of each of the blocks and has first information for identifying whether the respective block includes a control code other than user data;
wherein the blocks comprise a first block, a second block, and a third block that are successively transferred in the stated order;
the first block, the second block and the third block include a first synchronization header, a second synchronization header and a third synchronization header as the synchronization header, respectively; and
each of the at least two nodes is configured to:
acquire the first synchronization header, the second synchronization header, and the third synchronization header;
perform, in a case where a value of the first information of the second synchronization header is incorrect, a first judgment as to whether or not the value of the first information of the second synchronization header can be estimated based on the first synchronization header and the third synchronization header so that the second block is consistent with the first block and the third block;
judge, in a case where a value of the first information of the first synchronization header and a value of the first information of the third synchronization header is same, that the second synchronization header can be estimated in the first judgment; and
correct the second synchronization header into an estimated value of the first information.

7. The data transfer system according to claim 6, wherein:
each of the blocks contains second information indicating a type of data included therein; and
each of the at least two nodes is configured to:
perform, in a case where it is judged in the first judgment that the value of the first information of the second synchronization header cannot be estimated, a second judgment as to whether or not the value of the first information of the second synchronization header can be estimated based on the second information included in the first block and the second information included in the third block; and
correct the second synchronization header based on a result of the second judgment so as to be consistent with the first block and the third block.

8. The data transfer system according to claim 7, wherein the second information indicating the type of the data is located in a head position of a data part of each of the blocks.

9. The data transfer system according to claim 6, wherein:
the data transfer system comprises a Multiprotocol Label Switching (MPLS) network configured to transfer the frame encapsulated by using an MPLS label; and
each of the at least two nodes is configured to:
generate, in a case of being provided at an entrance edge to the data transfer system, the blocks after adding the MPLS label to the frame; and
remove, in a case of being provided at an exit edge from the data transfer system, the MPLS label from the frame after attempting to correct at least one of the synchronization headers.

10. The data transfer system according to claim 6, wherein each of the at least two nodes is configured to correct the second synchronization header into the value indicating that the second block contains only user data in a case where the first synchronization header indicates that the first block contains only the user data and the third synchronization header indicates that the third block contains only the user data.

* * * * *